June 3, 1941.  E. R. COUDEN  2,244,611
METHOD AND MEANS FOR SPREADING DISKS
Filed April 18, 1938  3 Sheets-Sheet 3

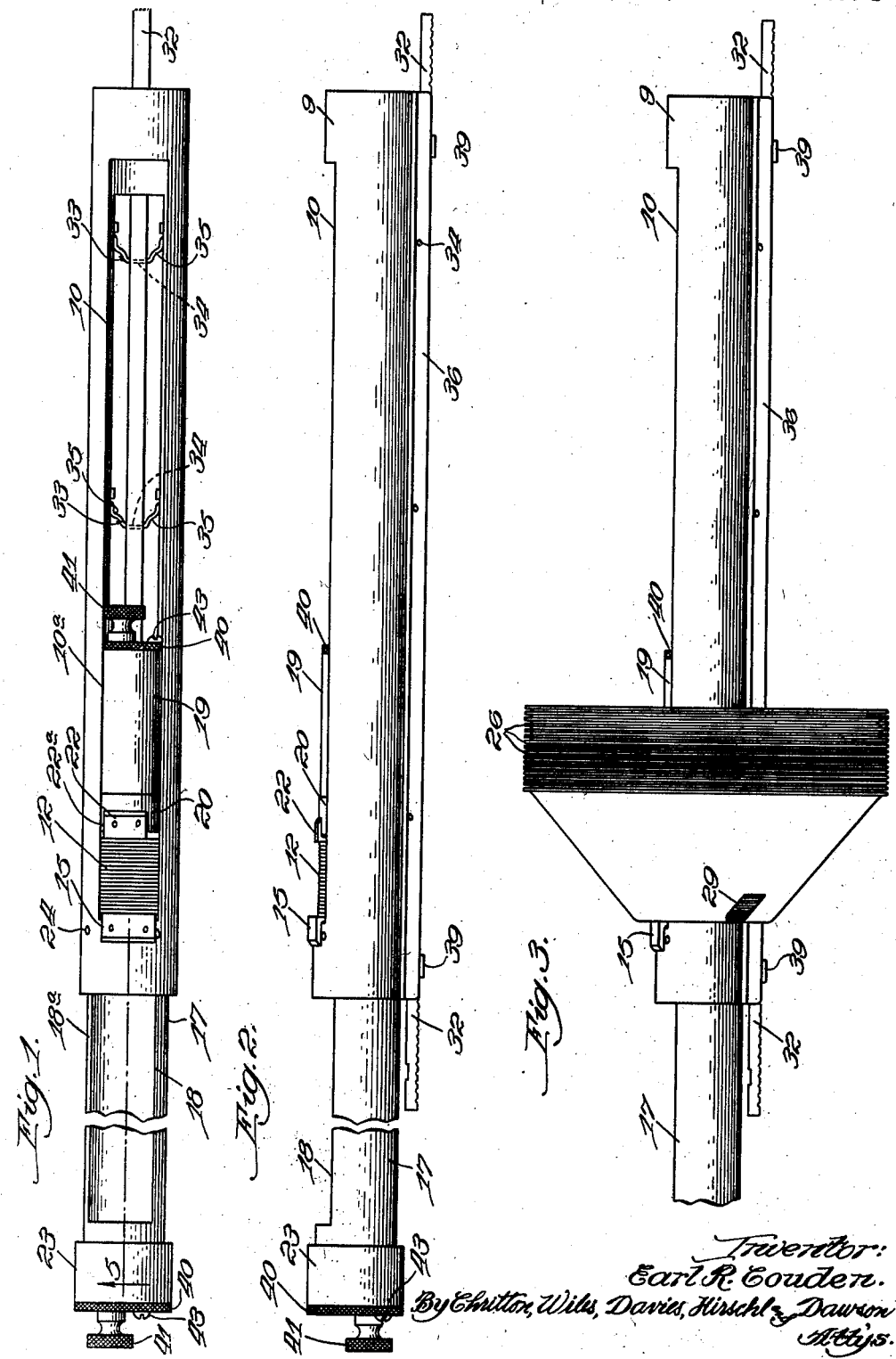

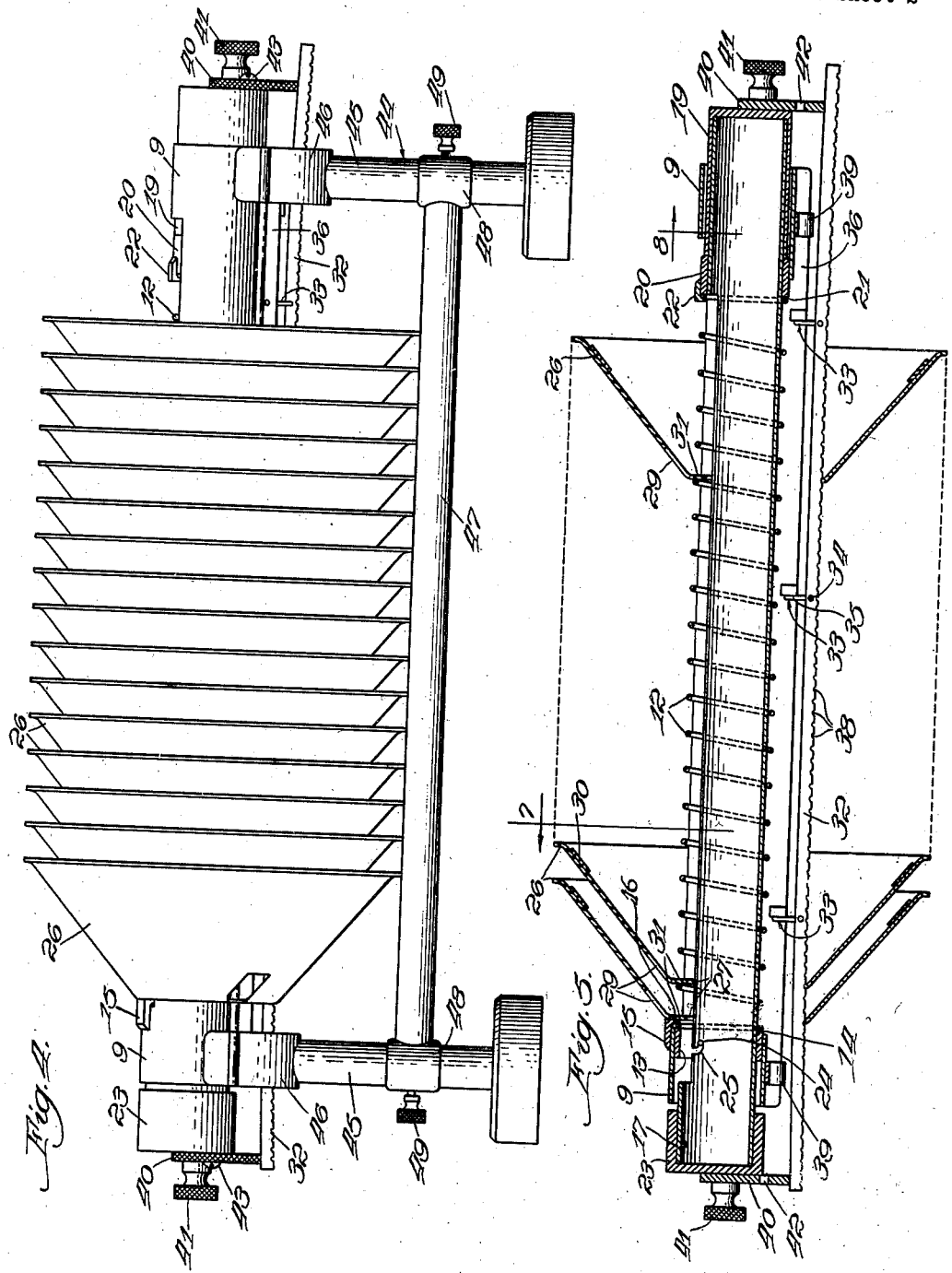

Inventor:
Earl R. Couden.
By Chritton, Wiles, Davis, Hirsch & Dawson
Attys.

Patented June 3, 1941

2,244,611

UNITED STATES PATENT OFFICE 2,244,611

METHOD AND MEANS FOR SPREADING DISKS

Earl R. Couden, Chicago, Ill.

Application April 18, 1938, Serial No. 202,750

26 Claims. (Cl. 141—1)

My invention relates generally to method and means for separating disks to condition them for cleaning; but more particularly to disks of cream separators commonly provided as centrally apertured and of frusto conical form permitting the disks to nest.

The cleansing of disks, particularly of the type which nest one within the other and form what is commonly known in the cream separating art, as a bowl, has presented a serious problem particularly in connection with the equipment used by dairymen. It is essential to sanitation that these disks be thoroughly cleaned frequently. Separation of the disks individually from each other and individual washing thereof is so tedious and time-consuming, particularly because of the large number of these disks of each machine, as to render the cleansing of the disks in this way a practical impossibility. The common practice is to mount the disks upon a support with an attempt to separate them into spaced apart relation and immerse them in a cleansing fluid. Such structures, however, present the great objection that even if all of the disks may be spaced from each other initially, the action produced by movement of the disk assembly in the cleansing fluid causes at least certain of the disks to become mutually contacted and oftentimes adhered to each other, preventing the necessary flow of fluid between them and into contact therewith to properly cleanse them, resulting in the re-assembly of the disks in the cream separator in unclean, unsanitary, condition with the manifest objections.

My primary object is to provide improvements in means to be used in connection with the cleaning of disks and in methods for separating disks, whereby the disks may be quickly and positively manipulated into spaced apart relation and maintained therein during the operation of washing the disks in a cleansing bath, to the end of insuring the proper cleaning of all of the disks; and other objects as will be manifest from the following description.

Referring to the accompanying drawings in which I have illustrated my invention for effecting the spacing of disks of cream separators of the centrally apertured frusto conical type—

Figure 1 is a plan view, with a portion of the structure broken away, of disk spreading mechanism embodying my invention and by which my novel method may be practiced, the mechanism being shown in normal position.

Figure 2 is a view in side elevation of the mechanism of Fig. 1.

Figure 3 is a view like Fig. 2 and of the construction therein shown illustrating the initial positioning of the gang of disks thereon to be separated, showing them in their initial position upon assembly with the mechanism.

Figure 4 is a view in side elevation of the mechanism, together with a supporting cradle therefor, showing the mechanism in the position to which it is actuated for spreading the disks likewise shown in this figure.

Figure 5 is a view in longitudinal sectional elevation of the structure and disks shown in Fig. 4 and in the positions represented in this last referred to figure.

Figure 7:
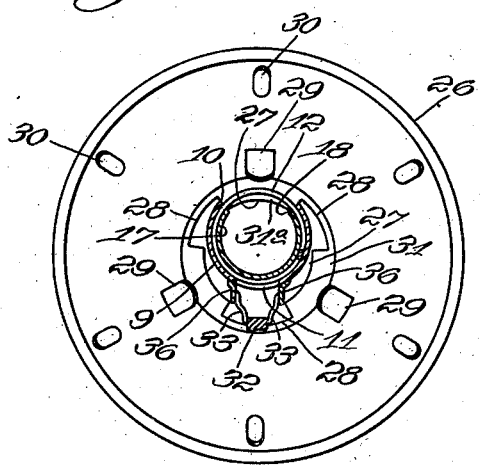
Figure 8:
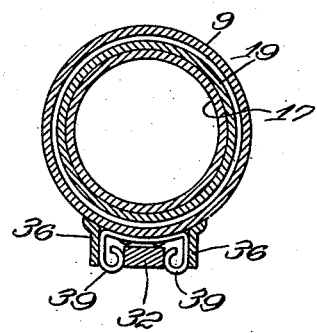

Figure 7 is a section taken at the line 7 on Fig. 5 and viewed in the direction of the arrow; and Figure 8, an enlarged section taken at the line 8 on Fig. 5 and viewed in the direction of the arrow, but showing the securing bar forming a part of the mechanism, in the normal position shown in Figs. 2 and 3.

Inasmuch as the invention was devised for use more particularly in connection with the cleansing of cream separator disks and as by far the greater proportion of cream separators in use employ disks of the centrally apertured frusto conical type, I have chosen to illustrate my invention as applied to cream separator disks of the particular type mentioned, but not with the idea of limiting the invention thereto as it may be utilized in connection with disks of other kinds of machines, as well as other kinds of disks.

The particular illustrated embodiment of my invention comprises a bar 9 shown in the form of a cylindrical tube open at both ends and having diametrically opposed slots 10 and 11 extending lengthwise thereof but reaching short of the ends of the tubue.

The tube 9 contains a coil spring 12, as for example of the compression type, which extends at its convolutions into the slot 10 for the disk-spreading purpose as hereinafter explained. One end of the spring 12 connects with the tube 9; the connection shown being provided by the soldering of an end convolution of the spring to an end of a bushing 13 fixed in the tube 9 at one end of the tube, as represented at 14, and providing a clip 15 secured to the tube and having projections 16 clamping this convolution in place against the end of the bushing.

The other end of the spring 12 is connected with a tube 17 which is of smaller diameter than the tube 9 and the spring 12 and is slidable therethrough and slotted lengthwise as indicated at 18 in registration with the slot 10.

The tube 17 is provided, at its inner end, with a socket member 19 and adjacent thereto with a surrounding sleeve 20 rigid with the tube 17.

The sleeve 20 slidingly fits the tube 9 and the tube 17 slidingly fits the bushing 13. The tubes are thus spaced apart between the sleeve and bushing, this space being occupied by the spring 12 and thus the tube 17 is free to slide in the tube 9 without rubbing against the spring.

The illustrated connection of the spring 12 with the tube 17 is provided by soldering the end convolution of the spring adjacent the sleeve 20, to this sleeve as indicated at 21, and providing a clip 22, similar to the clip 15, carried by the sleeve 20 and clamping this convolution in place, the clip being of less length than the width of the slot 10.

The end of the tube 17 remote from its connection with the spring 12 is provided with a socket member 23 into which the adjacent end of the tube 17 extends and is secured, the member 23 affording a stop limiting telescoping movement of the tube 17 within the tube 9, namely, to the position shown in Figs. 4 and 5.

By reason of the provision of the tubes 9 and 17 and the spring 12 and the connections between the tubes and spring as shown and described, the spring 12 is caused to be expanded lineally when the tubes are telescoped (Figs. 4 and 5) for the purpose hereinafter described, in which position the tubes may be held in spring expanded condition, by any suitable retaining means such as for example the connection shown and comprising an inwardly extending pin 24 on the tube 9 and adapted to enter a bayonet slot 25 in the tube 17 and become interlocked with the wall of this slot, upon slight rotational and longitudinal movement of the tube 17.

In the sliding of the tube 17 in the tube 9 into and out of extreme telescoped position therein, the tube 17 slides at the edge 18a of its slot 18 along the pin 24 and at the edge 22a of the clip 22 closely along the edge 10a of the slot 10, thus preventing any undue relative rotational movement between the tubes 10 and 17, but permitting of the desired degree of such movement for locking the tubes together in telescoped condition as above explained.

As a preface to a description of the mechanism in so far as above described, it may be stated that the disks which I have chosen, by way of example, to illustrate the operation of the mechanism, and which are represented at 26, are of the well known type above referred to, their central openings being shown at 27 and of considerably larger diameter than the above described parts of the mechanism, and the walls of the openings 27 having three notches 28 the lower one of which (Fig. 7) is wider than the other two.

The disks 26 contain the usual fluid-passage openings 29; the inner conical surfaces of the disks are provided with slightly protruding surfaces 30 which hold adjacent disks slightly spaced apart in their use in a cream separator; and the marginal edges of the walls of the openings 27 terminate in annular inwardly extending flanges 31 extending normal to the longitudinal axes of the disks.

In the use of the mechanism the disks to be cleaned and in nested condition, as shown in Fig. 3, are slipped over one end of the bar 9 (the mechanism being conditioned as shown in Figs. 1–3) to the position shown in Fig. 3, in which position the disks 26 rest at the walls of the openings 27 on the convolutions of the spring 12, the clip 15 forming a stop for the disks for properly positioning them as stated.

The operator then starts to push the tube 17 inwardly into the tube 9 which starts the expansion of the spring 12 and at the same time he shakes the entire mechanism to insure the lowering of the disks to positions between adjacent convolutions of the spring, the disks and convolutions thus alternating.

With the disks thus positioned, the operator continues to push the tube 17 inwardly which continues to expand the spring 12, causing the disks to be moved by the advancing convolutions of the spring along the bar 9 progressively greater distances, with the result of spacing the disks relative to each other as shown in Figs. 4 and 5 by the time the stop-sleeve 23 engages the adjacent end of the tube 9, the disks at their portions 31a extending into the slot 10. The operator then relatively rotates the tubes 10 and 17 to connect them together at the bayonet slot referred to which holds the tubes in telescoped condition.

In the use of the mechanism for washing the disks so spaced, the mechanism with the disks thereon, is immersed in a bath of cleaning fluid and moved back and forth therein to cause the fluid to flow against all portions of the disks this operation rendering desirable the securing of the disks against displacement on the disk-spacing mechanism out of the spaced positions referred to.

Any suitable means for so securing the disks may be provided. The means shown for this purpose comprise a bar 32 extending along the underside of the bar 9 and supported on yoke clips 33 journalled at their cross pieces 34 in the bar 32 and at their legs 35 in depending spaced apart flanges 36 secured to the underside of the tube 9 at opposite sides of the slot 11 and extending lengthwise thereof, thereby permitting the bar 32 to be bodily moved toward and away from the tube 9.

The bar 32 extends through the openings 27 in the disks 26 and operates when swung away from the bar 9 downwardly and to the right in Figs. 2 and 3 from the position shown in Figs. 1–3 to the position shown in Figs. 4–7, to engage the bottom walls of the lower ones of the notches 28 in the disks and force the disks at their portions 31a into engagement with the walls of the slot 10, the bar 32 in the movement referred to serving to force the disks from a normal canted position on the bar 9 to substantially erect position as shown in Figs. 4 and 5. If desired, the underside of the bar 32 at which it engages the disks 26 may be serrated as shown at 38.

As will be understood, the bar 32 is swung toward the bar 9 to the position shown in Figs. 2, 3 and 8, preliminary to the assembling of the disks 26 with the spacing mechanism, and as a means for releasably holding this bar in this position the tube 9 is provided with spring devices shown at 39 between which the bar 32 is yieldingly gripped.

As a means of swinging the bar 32 to disk-engaging position I provide on the ends of the socket members 19 and 23 circular disks 40 of substantially the same diameter as these socket members which are journalled thereon at journalling set screws 41 positioned eccentrically of the disks and the ends of these socket members. The disks 40, which contain arcuate slots as shown at 42 of the disk 40 illustrated in Fig. 6 and through which slots screws 43 carried by the socket members 19 and 23, extend, are movable from a position in which they extend concentrically with the sleeve members 19 and 23 as shown in Figs. 1 and 2 (which position they occupy in the application of the disks 26 to the mechanism and in the movement of the tube 17 to fully telescoped relation to the tube 9), to a position in which they extend eccentrically of the sleeve members in which movement they engage the opposite ends of the bar 32 forcing the latter out of engagement with the spring devices 39 and swinging it into the position for engaging the disks 26.

The flanges 36 are shown spaced apart a distance substantially equal to the width of the lower ones of the notches 28 in the disks 26 and thus the disks 26 cannot be assembled with the disk-spacing mechanism except in such position angularly about the longitudinal axis of the mechanism, that the portions 31a of the disks register with the slot 10.

Figure 6:
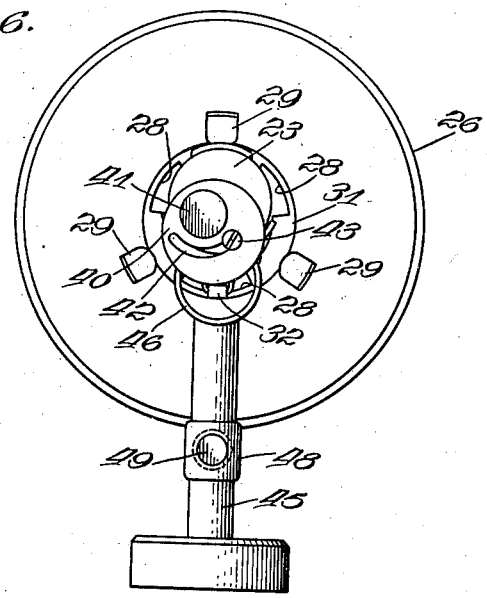
Figure 6 is an end view of the structure and disks illustrated in Fig. 4, with the parts shown in the position illustrated in this last referred to figure, the view being taken from the left-hand side in Fig. 4.

In Figs. 4 and 6 I have shown my disk spacing mechanism as associated with a supporting cradle represented generally at 44 and comprising a pair of uprights 45 provided at their upper ends with cradling elements 46 at which the disk spreading means, at its tube 9, may be supported, and a horizontal rod 47 having sleeve portions 48 at its ends surrounding the uprights 45 and on which latter the rod 47 is vertically adjustable, set screws 49 on the sleeves 48 being provided for holding the rod 47 in adjusted position.

The cradling device serves a number of purposes certain of which are as follows:

It serves as a means for facilitating the manipulation of the disk spacing mechanism. Thus after inwardly positioning the disks 26 between the convolutions of the spring 12 as above set forth, the mechanism may be applied to the cradling device to seat it on the cradling elements 46 as shown in Fig. 4 and the manipulation of the tube 17, to space the disks, may be effected with facility and ease.

It also serves as a means for insuring the securing of the disks 26 to the tube 9 in a position in which the disks extend in the erect position in Figs. 4 and 5. In performing this function the rod 47 would be adjusted vertically on the uprights 45 to such position that when the disk spacing mechanism with the disks mounted thereon, is applied to the cradling elements 45, the lower edges of the disks 26 will engage the rod 47 and thus be swung to the erect position shown in the drawings; and as the disks 26 are driven along the tube 9 by moving the tube 17 inwardly to space the disks as shown in Figs. 4 and 5, the disks will slide along the rod 47 while being maintained in the erect position referred to.

It also serves as a convenient means for supporting, during the drying of the washed disks, the disk spacing mechanism with the disks spaced thereon.

While I have illustrated and described a particular construction embodying my invention and a particular construction by which my novel method may be practiced, I do not wish to be understood as intending to limit it thereto, as the same may be variously modified and altered and the invention embodied in other forms of structure and my novel method practiced by the use of other constructions without departing from the spirit of my invention.

What I claim as new and desire to secure by Letters Patent, is:

1. Mechanism for spreading disks comprising means including a series of members movable bodily and terminally attached together for engaging the respective disks operative when actuated to move the disks bodily relative to each other progressively greater distances to position the disks in spaced relation and means to move all but one of said members beginning at one point in the series through distances progressively increasing in their order of occurrence in the series from said point.

2. Mechanism for spreading disks comprising a supporting member for the disks of a size on to which disks in closely grouped relation are capable of being threaded as a unit and along which the disks are movable, means comprising relatively movable parts for engaging the respective disks in closely grouped relation, said parts being movable bodily and being connected together and operating when actuated to effect bodily relative shifting of the disks into spaced relation along said support and means to cause such relative movement.

3. Mechanism for spreading disks having apertures therein comprising a supporting member to extend through the apertures in the disks and along which the disks are movable, and means comprising a series of members movable bodily and connected together for engaging the disks between adjacent members operating when actuated to effect bodily relative shifting of the disks into spaced relation along said support, means to cause relative movement between said member and said first named means, and means to move said disks toward a position normal to said member.

4. Mechanism for spreading disks comprising coil spring means for receiving disks in grouped relation between convolutions thereof, said spring means being constructed and arranged for operation at spaced points for expansion simultaneously of coils thereof lineally to effect spacing of said disks, said multiplicity of coils being located between said points, and means to lineally extend said spring means.

5. Mechanism for spreading disks comprising coil spring means for receiving disks between the convolutions thereof and operative when extended lineally to effect spacing of said disks, means to lineally extend said spring, and means for securing said disks in spaced relation.

6. Mechanism for spreading disks comprising a supporting member for the disks and along which the disks are movable, coil spring means for receiving the disks between the convolutions thereof, said spring means being constructed and arranged for operation at spaced points to effect expansion simultaneously and lineally of a multiplicity of convolutions thereof, said multiplicity of convolutions being located between said points, and means for extending said spring, said spring operative when extended lineally to effect spacing of said disks along said member.

7. Mechanism for spreading disks comprising a supporting member for the disks and along which the disks are movable, coil spring means for receiving the disks between the convolutions thereof, means for extending said spring, said spring operative when so extended lineally to effect spacing of said disks, and means for securing said disks in spaced relation.

8. Mechanism for spreading disks having apertures therein comprising a supporting bar to extend through the apertures in the disks and along which the disks are movable, a coil spring associated with said bar for receiving the disks between its convolutions, said spring means being constructed and arranged for operation at spaced points to effect expansion simultaneously of a multiplicity of convolutions thereof, said multiplicity of convolutions being located between said points, and means for extending said spring; said spring operating when so extended to effect shifting of said disks into spaced relation along said bar.

9. Mechanism for spreading disks having apertures therein comprising a supporting bar to extend through the apertures in the disks and along which the disks are movable, a coil spring associated with said bar for receiving the disks between its convolutions; means for extending said spring; said spring operating when so extended to effect shifting of said disks into spaced relation along said bar, and means for securing said disks in spaced relation on said bar.

10. Mechanism for spreading disks having apertures therein comprising a supporting bar to extend through the apertures in the disks and along which the disks are movable, a coil spring associated with said bar for receiving the disks between its convolutions and operative when extended lineally to effect shifting of said disks into spaced relation along said bar, and a member extending along, and movable on, said bar toward and away from the latter and operative to hold said disks in spaced relation on said bar.

11. Mechanism for spreading disks having apertures therein comprising a supporting bar to extend through the apertures in the disks and along which the disks are movable, a coil spring associated with said bar for receiving the disks between its convolutions and operative when extended lineally to effect shifting of said disks into spaced relation along said bar, and a member extending along, and movable on, said bar toward and away from the latter and extending through the apertures in the disks and operative when moved in a direction away from said bar to engage the disks at the walls of their apertures and hold said disks in spaced relation on said bar.

12. Mechanism for spreading disks having apertures therein comprising a supporting bar to extend through the apertures in the disks and along which the disks are movable, a coil spring associated with said bar for receiving the disks between its convoluutions and operative when extended lineally to effect shifting of said disks into spaced relation along said bar, a member extending along, and movable on, said bar toward and away from the latter and extending through the apertures in the disks and operative when moved in a direction away from said bar to engage the disks at the walls of their apertures and hold said disks in spaced relation on said bar, and devices journalled on said bar for controlling the position of said member.

13. Mechanism for spacing disks having apertures therein comprising a hollow supporting bar to extend through the apertures in the disks and along which the disks are movable, said bar having a slot extending lengthwise thereof, and a coil spring in said bar with its convolutions extending into said slot and receiving the disks between its convolutions and operative when extended lineally to effect shifting of said disks into spaced relation along said bar.

14. Mechanism for spacing disks having apertures therein comprising a hollow supporting bar to extend through the apertures in the disks and along which the disks are movable, said bar having a slot extending lengthwise thereof, a coil spring in said bar with its convolutions extending into said slot and receiving the disks between its convolutions and operative when extended lineally to effect shifting of said disks into spaced relation along said bar, and means engaging said disks for securing them in spaced relation on said bar.

15. Mechanism for spacing disks having apertures therein comprising a hollow supporting bar to extend through the apertures in the disks and along which the disks are movable, said bar having a slot extending lengthwise thereof, a tube slidable in said hollow bar and having a slot extending lengthwise thereof in registration with said first-named slot, and a coil spring in said bar with its convolutions extending into said first-named slot and receiving the disks at their apertured portions between its convolutions, one end of said spring being connected with said bar and its opposite end with said tube, said spring being operative when extended lineally to effect shifting of said disks into spaced relation along said bar.

16. Mechanism for spacing disks having apertures therein comprising a hollow supporting bar to extend through the apertures in the disks and along which the disks are movable, said bar having a slot extending lengthwise thereof, a tube slidable in said hollow bar and having a slot extending lengthwise thereof and in registration with said first-named slot, a coil spring in said tube with its convolutions extending into said first-named slot and receiving the disks at their apertured portions between its convolutions, one end of said spring being connected with said bar and its opposite end with said tube, said spring being operative when extended lineally to effect shifting of said disks into spaced relation along said bar, and means carried by said bar and extending through the apertures in said disks for securing the disks in spaced relation on said bar.

17. Mechanism for spreading centrifugal separator disks comprising: a member to receive a plurality of disks to be separated, in grouped relation; said member having portions contructed and arranged for simultaneous flexing to provide a plurality of spaces, and means to operate said portions to receive edges of the respective grouped disks therebetween and then to cause separation of the respective portions to move the disks to spaced relation.

18. The combination of claim 17 in which the member is a coiled spring.

19. Mechanism for spreading disks comprising a flexible element constructed and arranged for elongation and having a series of members engageable with the disks, said members being movable through said elongation to move the disks bodily relatively to each other progressively greater distances to position the disks in spaced relation, and means operable to lineally extend the element.

20. Mechanism for spreading disks comprising parts movable relatively to each other, an element attached at opposite ends to said parts and being free intermediate such ends, said element having a series of members between said ends engageable with the disks, said members being movable through said relative movement to move the disks bodily relatively to each other progressively greater distances.

21. The method for spacing apart a series of elements in the form of thin disks or the like from a grouped condition, which comprises arranging said grouped elements in contact with a contracted means providing multiplicity of spaces simultaneously through lineal expansion of the means, lineally expanding said means and receiving the elements in the spaces of said means and continuing the lineal expansion of said means to carry said elements greater distances apart.

22. The method of spacing apart a series of elements in the form of thin disks or the like from a grouped position which comprises, arranging said grouped elements on a linearly expandable support, expanding said support and thereby providing spaces receiving said elements by movement in a direction transverse to that of expansion and then linearly simultaneously moving said members away from a certain point in the series, carrying the respective moved members progressively greater distances from said point to positions each an equal distance from the final position of the member or members adjacent thereto.

23. Mechanism for spacing disks comprising first and second relatively slidable supporting elements and a coiled means extensible lineally through the relative sliding of said elements, said coiled means being disposed about the first element and having its convolutions arranged to receive the disks therebetween and operative when extended lineally to effect shifting of the disks into spaced relation along the first element, said second element being disposed about the coiled means and in outwardly spaced relation to the first element, whereby a guideway for said means is provided between the elements.

24. Mechanism for spreading disks comprising first and second relatively slidable supporting elements and an extensible means disposed for extension lineally through the relative sliding of said elements, said means being disposed along the first element and having parts arranged to receive the disks therebetween and operative when the means is extended lineally to effect shifting of the disks into spaced relation along the first element, said second element being disposed about the extensible means and in outwardly spaced relation to the first element, whereby a guideway for the extensible means is provided.

25. Mechanism for spacing disks comprising first and second elements, a lineally extensible coiled means, said coiled means being disposed about the first element and having its convolutions arranged to receive the disks therebetween and operative when extended lineally to effect shifting of the disks into spaced relation along the first element, said second element being disposed about the coiled means and in outwardly spaced relation to the first element, whereby a guideway for said means is provided between the elements.

26. The method of varying the proximity to each other of a series of elements by use of a lineally contractile means, comprising disposing said elements between parts of said means, and lineally expanding said means from points between which a multiplicity of said parts are located to simultaneously vary the proximity of the parts to each other and accordingly vary the proximity of said elements to each other.

EARL R. COUDEN.